United States Patent
DeJesus et al.

(10) Patent No.: US 9,332,163 B2
(45) Date of Patent: May 3, 2016

(54) INDOOR BUBBLE ADAPTER

(71) Applicant: Sensormatic Electronics, LLC, Boca Raton, FL (US)

(72) Inventors: Carlos E. DeJesus, Boynton Beach, FL (US); Frederick Michael McBride, Belfast (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 4 days.

(21) Appl. No.: 13/944,142

(22) Filed: Jul. 17, 2013

(65) Prior Publication Data

US 2014/0307088 A1 Oct. 16, 2014

Related U.S. Application Data

(60) Provisional application No. 61/810,322, filed on Apr. 10, 2013.

(51) Int. Cl.
*H04N 5/225* (2006.01)
*H04N 7/18* (2006.01)
(Continued)

(52) U.S. Cl.
CPC .......... *H04N 5/2252* (2013.01); *G08B 13/1963* (2013.01); *G08B 13/19619* (2013.01); *H04N 7/18* (2013.01); *G03B 17/00* (2013.01); *G03B 37/02* (2013.01); *G03B 2217/00* (2013.01)

(58) Field of Classification Search
CPC . H04N 5/2252; H05K 5/00; G08B 13/19617; G08B 13/19619; G08B 13/1963; G08B 13/19632; G03B 17/08
USPC ............................. 348/143, 151, 373; 396/427
See application file for complete search history.

(56) References Cited

U.S. PATENT DOCUMENTS 4,320,949 A * 3/1982 Pagano ........................ 396/427
4,984,089 A 1/1991 Stiepel et al.
(Continued)

FOREIGN PATENT DOCUMENTS

WO 0004720 A1 1/2000
WO 0203701 A2 1/2002

OTHER PUBLICATIONS

International Search Report and Written Opinion of the International Searching Authority, mailed on May 26, 2014, from counterpart International Application No. PCT/US2014/012906, filed Jan. 24, 2014.

(Continued)

*Primary Examiner* — Lin Ye
*Assistant Examiner* — Chriss Yoder, III
(74) *Attorney, Agent, or Firm* — HoustonHogle, LLP (57) ABSTRACT

A bubble adapter for installed security cameras, such as Pan/Tilt/Zoom ("PTZ") security cameras fits over the head of the PTZ camera, and attaches to a mounting region of a base of the security camera via a field-deployable attachment mechanism. The bubble of the bubble adapter protects and conceals the head of the PTZ camera and its components. Using the bubble adapter, service personnel add bubbles to existing PTZ camera installations that are lacking bubbles in the field. This avoids the expense and downtime associated with the current method for adding bubbles to PTZ camera installations lacking bubbles. The current method requires removing the installed PTZ cameras, and replacing them with PTZ cameras having factory-installed bubbles. In addition, the bubble adapter provides an integrated airflow system that allows the security camera to maintain thermal control when the bubble adapter is attached to the security cameras.

19 Claims, 10 Drawing Sheets

(51) Int. Cl.
 *G08B 13/196* (2006.01)
 *G03B 17/00* (2006.01)
 *G03B 37/02* (2006.01)

(56) References Cited

U.S. PATENT DOCUMENTS

| | | | | |
|---|---|---|---|---|
| 5,689,304 | A * | 11/1997 | Jones et al. | 348/373 |
| 6,061,087 | A * | 5/2000 | Schieltz et al. | 348/151 |
| 6,234,691 | B1 * | 5/2001 | Jones et al. | 396/427 |
| 6,992,723 | B1 * | 1/2006 | Wulf et al. | 348/374 |
| 8,174,573 | B2 * | 5/2012 | Lin et al. | 348/143 |
| 2001/0022627 | A1 | 9/2001 | Bernhardt | |
| 2003/0185556 | A1 | 10/2003 | Stiepel et al. | |
| 2007/0126872 | A1 * | 6/2007 | Bolotine et al. | 348/151 |
| 2011/0205703 | A1 * | 8/2011 | Weaver et al. | 361/695 |

OTHER PUBLICATIONS

International Preliminary Report on Patentability, mailed on Jul. 27, 2015, from counterpart International Application No. PCT/US2014/012906, filed Jan. 24, 2014.

* cited by examiner

INDOOR BUBBLE ADAPTER

RELATED APPLICATIONS

This application claims the benefit under 35 U.S.C. §119(e) of U.S. Provisional Application No. 61/810,322, filed on Apr. 10, 2013, which is incorporated herein by reference in its entirety.

BACKGROUND OF THE INVENTION

Security cameras, such as pan/tilt/zoom ("PTZ") video cameras, are an integral part of security solutions for protecting people, premises, and reducing risk. Within a premises or building, business owners install PTZ cameras at egress points, at the point of sale, and in other locations that require monitoring and tracking of people, goods and services. Another common application is at casinos. The PTZ video cameras are used to monitor employees and players.

PTZ cameras typically include a base region or portion that mounts to a surface such as a wall or ceiling or mounting bracket within the premises. PTZ cameras also mount in a recessed fashion within ceilings similar to recessed lighting. The base of the PTZ cameras typically includes the majority of non-moving components such as electronics and motors for powering and controlling the camera, network and video interfaces, and cooling fans for thermal considerations.

The PTZ cameras also typically include a head with a panning portion that turns left and right with respect to the base region, and a tilting portion that rotates up and down with respect to the base region. The cameras' optical components are typically housed within the tilting portion.

Manufacturers of PTZ cameras offer different options that enhance the capabilities and utility of the cameras. The manufacturers require that the customer order some of the options at the time of purchase, and not as an "add-on" option or accessory after purchase and delivery of the PTZ camera. This is because these options require the manufacturers to design and assemble the PTZ cameras and the options in a specific fashion, requiring quality controls and procedures that only the manufacturers provide. The manufacturers require these controls to assure proper operation of the cameras, to address safety and design concerns, and to maintain warranty status.

One of the options that customers purchase is a dome or bubble that covers the cameras. Bubbles not only provide extra protection of the cameras and lenses, but also conceal the visual behavior of the moving portions of the cameras, and the presence of the camera itself within a room.

Bubbles for interior PTZ cameras are important in establishments such as casinos. Security personnel at casinos seek to minimize awareness of the cameras by their patrons. Bubbles with a dark or "smoked" appearance also conceal the otherwise visible panning and tilting operations of the cameras, which prevents patrons from seeing the direction the cameras are pointing.

SUMMARY OF THE INVENTION

Manufacturers of current PTZ cameras offer bubbles as a factory-installed option. The bubbles are a permanent part of the PTZ camera assemblies, and normally cannot be removed. A major reason for this is because PTZ cameras require built-in fans for cooling the cameras, and the bubbles must be designed for and integrated with the cameras' thermal design characteristics. As a result, an attempted retrofit to an existing PTZ camera installation might restrict or compromise the airflow to the camera, causing overheating or damage to the camera and its components.

This creates a problem for customers with an installed base of PTZ cameras that wish to add a bubble to the cameras. Customers must remove the cameras from the walls and ceilings, and return them to the manufacturer for factory-installed bubble upgrades, or purchase new replacement cameras that include the integrated bubbles.

Both options are expensive and require significant labor. Moreover, the downtime created by removing and replacing the cameras compromises the security of the premises that the cameras were purchased to protect.

The invention provides a field-upgradeable bubble adapter for existing indoor PTZ camera installations lacking bubbles. The bubble adapter is secured to a mounting region of the base of the existing PTZ cameras.

The bubble adapter has airflow characteristics that seamlessly integrate with the airflow design and characteristics of the PTZ cameras. These features enable customers and field service personnel to install the bubble adapters to an in situ PTZ camera installation within the customer premises.

In addition, the invention provides manufacturers with the ability to sell bubble adapters separately from the security cameras to which they attach. Customers order and attach the bubble adapters to their existing cameras on an "as-needed" basis. This reduces the need for customers to have a priori knowledge of how many cameras, with and without bubbles, are required for a security installation.

In general, according to one aspect, the invention features a security camera system comprising a Pan/Tilt/Zoom ("PTZ") head of a security camera, a base of the security camera on which the PTZ head is held, the base comprising a mounting region, and a bubble adapter that fits over the PTZ head. The bubble adapter includes a housing that attaches to the base at the mounting region via a field-deployable attachment mechanism, and a bubble attached to the housing that encloses the PTZ head.

In one example, the field-deployable attachment mechanism comprises an interference fit system. In a preferred embodiment, the interference fit system comprises spring plungers disposed in pockets within the housing of the bubble adapter, and a detent in the mounting region of the base which accepts the spring plungers. Typically, the pockets within the housing extend radially outward from an inside surface of an outer rim of the housing.

According to another example, the field-deployable attachment mechanism comprises a set screw system. Using a set screw, an installer tightens the set screw within a set screw hole in the housing to secure the housing to the base of the security camera.

According to another aspect, the housing includes an air intake channel formed within the housing that includes air intake openings that accept air from outside the housing to enable airflow into the security camera. The air intake channel accepts an air filter placed before the air intake openings. Preferably, the air intake openings of the housing provide the airflow for air inlets of the PTZ head of the security camera for cooling the security camera.

According to yet another aspect, the base of the security camera includes one or more fans which draw the airflow provided by the air intake openings of the housing into air inlets of the PTZ head of the security camera to cool the security camera, and air exhaust openings which allow the airflow to exit the security camera.

In another implementation, the housing accepts a trim ring that secures a lip of the bubble to the housing for fastening the bubble to the housing. Preferably, the trim ring fastens the bubble to the housing using an interference fit. In yet another implementation, the housing further comprises a tamper resistant bracket which discourages tampering of the bubble adapter by unauthorized personnel.

In another embodiment, the housing comprises a cover ring that mounts to the air intake channel, which conceals the base of the security camera after the housing is attached to the base of the security camera. Preferably, the cover ring includes a safety lanyard that fastens to the base of the security camera, which protects the bubble adapter from dropping during attachment and removal.

According to yet another aspect, the bubble has a smoked appearance which provides the concealment of the security camera and its components.

In general, according to another aspect, the invention features a bubble adapter for an installed security camera comprising a housing that attaches to the security camera. The housing includes an airflow system that allows airflow to the security camera for thermal control when the housing is attached to the security camera. In addition, the housing includes a bubble fastened to the housing that encloses at least a head of the security camera for protecting and concealing the security camera.

According to another aspect, the bubble adapter further comprises an interference fit system for securing the bubble adapter to the security camera. In the preferred embodiment, the interference fit comprises spring plungers disposed in pockets within the housing of the bubble adapter, and a detent in the mounting region of a base of the security camera which accepts the spring plungers.

According to another embodiment, the bubble adapter comprises a set screw system for securing the bubble adapter to the security camera.

According to yet another aspect, the housing includes an air intake channel formed within the housing that includes air intake openings that accept air from outside the housing to enable the airflow to the security camera.

In general, according to yet another aspect, the invention features a method for upgrading an installed security camera in the field to have a bubble. The method comprises placing a bubble adapter over a head of the security camera, pushing the bubble adapter towards a mounting region of a base of the security camera on which the head is held, and attaching the bubble adapter to the base at the mounting region via a field deployable attachment mechanism.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
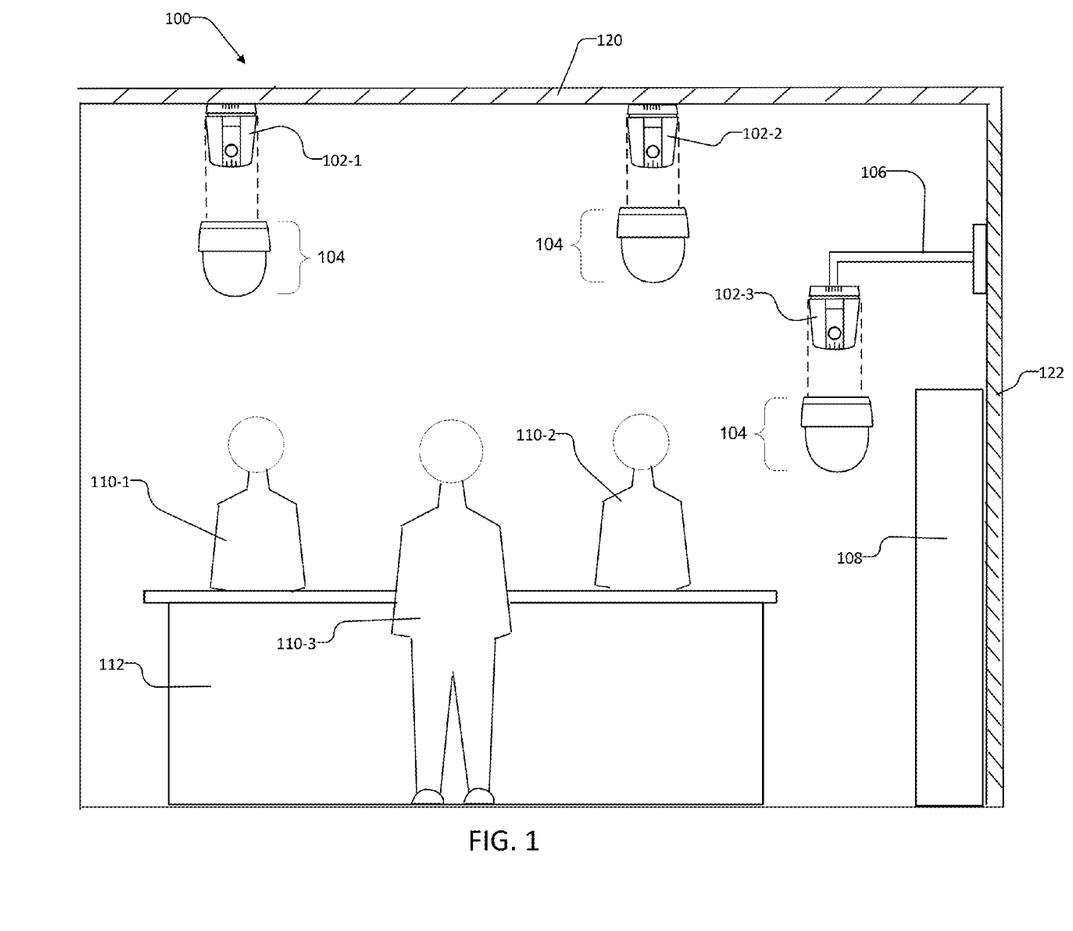
FIG. 1 is a schematic diagram showing a room with pan/tilt/zoom ("PTZ") cameras installed with different mounting configurations, wherein the PTZ cameras accept the inventive bubble adapter.

FIG. 1 displays an exemplary room 100 with PTZ cameras 102 installed in different configurations for security monitoring of the room 100 and the individuals 110 in the room 100. The PTZ cameras 102 are not equipped with factory-installed bubbles 202. The example room 100 is part of a retail or gaming (casino) establishment where an employee 110-3 interacts with customers 110-1 and 110-2 at a point of sale terminal or game console 112, in specific examples.

PTZ cameras 102-1 and 102-2 are mounted to ceiling 120 above the point of sale terminal or game console 112. PTZ camera 102-3 is mounted to wall 122 via wall bracket 106. The wall bracket 106 effectively moves the field of view for PTZ camera 102-3 beyond objects in the room 100 that would otherwise obstruct the field of view of the PTZ camera 102-3. Objects that obstruct the field of view of the PTZ cameras 102 include furniture such as cabinet 108.

Bubble adapters 104 attach to the installed PTZ cameras 102 within the room 100. The bubble adapters 104 secure to the PTZ cameras 102 as a field-upgradeable solution in the preferred embodiment.

When field service personnel secure the bubble adapters 104 to the PTZ cameras 102, there is no need to remove the installed PTZ cameras 102 or adjust their mountings in the illustrated embodiment. In addition, no modifications to the PTZ cameras 102 are required. The bubble adapters 104 utilize a field-deployable attachment mechanism such as an interference fit with the installed PTZ cameras 102, while also enabling proper airflow and cooling to the PTZ camera 102 and its internal components in the embodiments disclosed herein.

Figure 2:
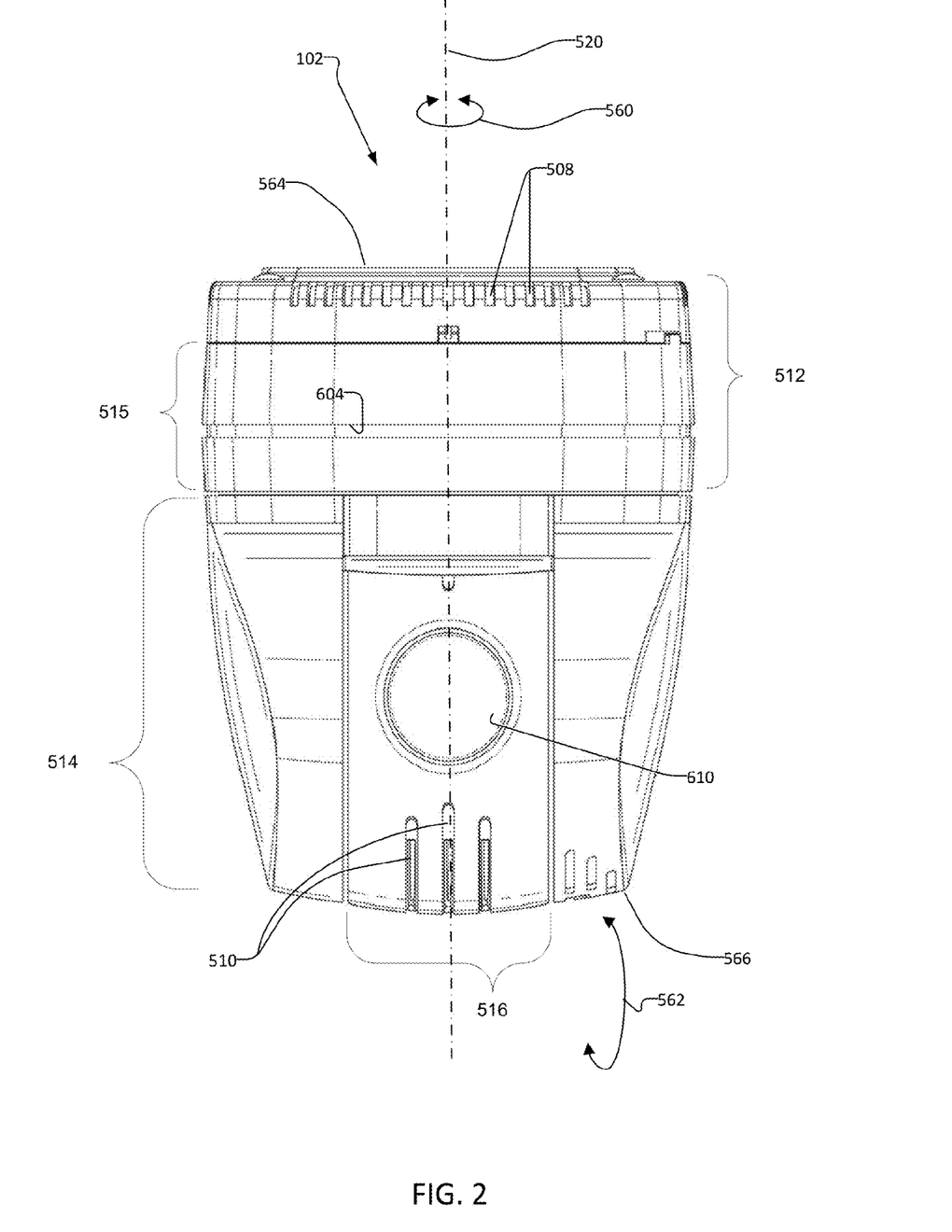
FIG. 2 is a scale plan view of a PTZ camera that accepts the bubble adapter, according to the invention, and further illustrating the basic portions and movement of the PTZ camera.

FIG. 2 shows the PTZ camera 102 according to one implementation. The PTZ camera 102 includes a base 512, a PTZ head 514 that moves about the pan axis 520 of the base 512 according to arrow 560, and a tilting region 516 that moves with respect to the pan axis 520 according to arrow 562. The tilting region 516 is included within the PTZ head 514 and moves independently of the PTZ head 514.

The camera lens 610 is included within the tilting region 516, which captures video images of the room 100 and provides the ability to zoom in and out of features of interest within the room 100 in one implementation. As a result, the PTZ camera 102 provides independent panning, zooming, and tilting of the field of view of the PTZ camera 102 in accordance with the security objectives of the operator.

The base 512 includes power and data cabling interfaces, electronics, fans for cooling, and control systems and motors for controlling the pan, tilt, and zoom features of the PTZ cameras 102. Field service personnel secure the PTZ cameras 102 to surfaces such as walls 122, ceilings 120, or wall brackets 122 via screw holes provided in the underside 564 of the base 512. The base 512 also includes air exhaust openings 508, and a mounting region 515.

The illustrated PTZ camera 102 requires active cooling throughout its internal components in accordance with thermal design requirements. As a result, the PTZ camera 102 has integrated cooling paths and channels to provide airflow to its internal components. Air enters the PTZ camera 102 through air inlets 510 in the tilting region 516, from the camera side 566 of the PTZ camera 102. Cooling fans within the base 512 draw outside air through the air inlets 510. The air drawn in from the air inlets 510 flows across the internal components of the PTZ camera 102, cooling the components in the process. The air then exits the PTZ camera 102 via the air exhaust openings 508 of the base 512.

The mounting region 515 of the base 512 also includes a recessed channel or detent 604 that encircles the base 512, orthogonal to the pan axis 520.

Figure 3:
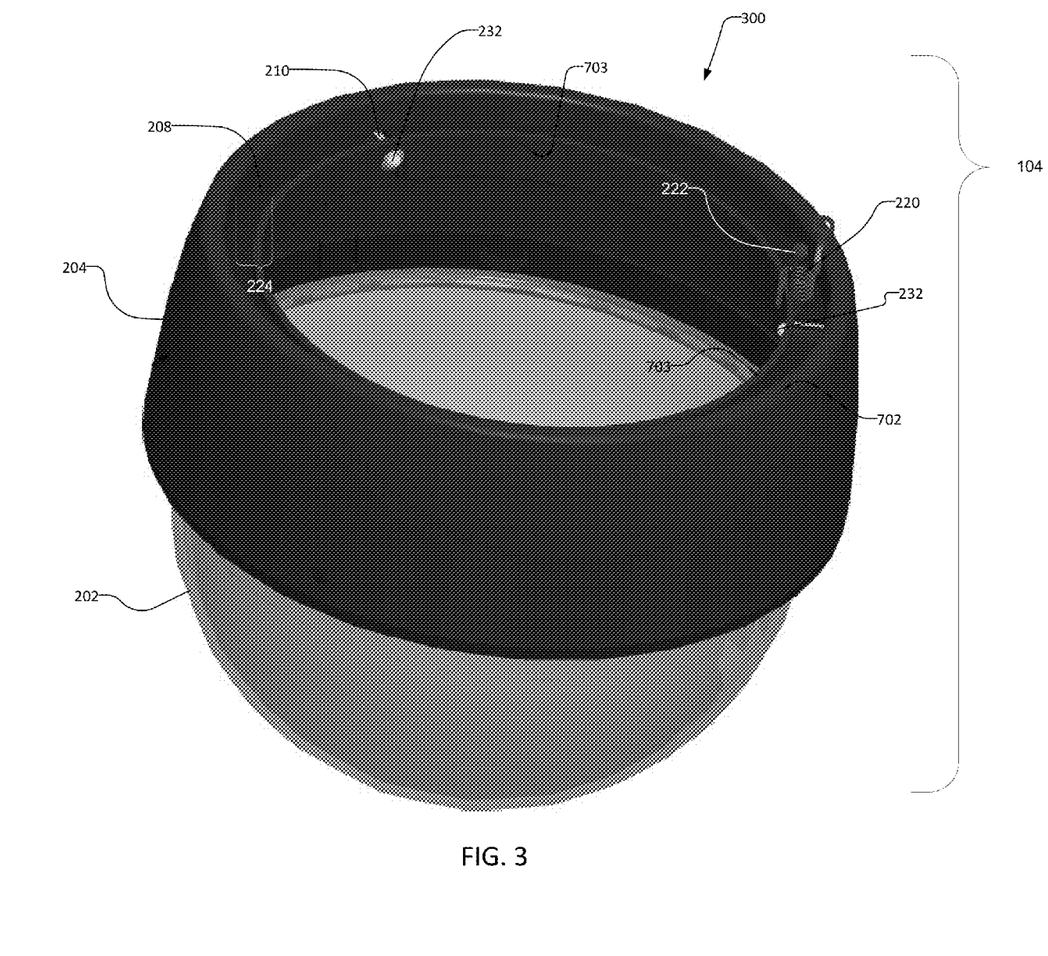
FIG. 3 is a perspective scale view of a preferred embodiment of the bubble adapter.

FIG. 3 show a perspective scale view of the bubble adapter 104 that shows additional detail of its components. In one embodiment, the bubble adapter 104 has a transparent or translucent bubble 202 that attaches to housing 204. Spring plungers 232 fastened to pockets 210 within the housing 204 provide an interference fit between the housing 204 and the detent 604 of the base 512 of the PTZ camera 102. The spring plungers 232 are spring-loaded, and are normally in a fully-released or "at rest" position.

The pockets 210 are openings in the housing 204 that accept the spring plungers 232. The pockets 210 extend radially out from the inside of the outer rim 702 of the housing 204, through an air intake channel 224 of the housing 204, and to the inner rim 703. The spring plungers 232 seat within the pockets 210, such that the surfaces of the spring plungers 232 extend slightly beyond the edge of the inner rim 703 of the housing 204 when the spring plungers 232 are at rest.

The air intake channel 224 encircles the housing 204. The air intake channel 204 preferably is recessed with respect to the inner rim 703 and the outer rim 702 of the housing 204. The air intake channel 224 accepts a replaceable air filter 208 that preferably press-fits within the air intake channel 224. The air intake channel 224 has FIG. 6 air intake openings 212 for drawing air into the bubble adapter 104, and down toward the air inlets 510 of the PTZ camera 102. The air intake openings 212 cannot be seen in FIG. 3 because the air filter 208 is installed and blocks the view of the air intake openings 212.

The spring plungers 232 secure the bubble adapter 104 to the detent 604 of the PTZ camera 102. When the installer pushes the bubble adapter 104 down over the PTZ head 514 towards the base 512 of the PTZ camera 102, the spring plungers 232 initially compress when they come in contact with the base 512. The spring plungers 232 compress inward towards the outer rim 702 of the housing 204.

When the installer continues to push the bubble adapter 104 further onto the mounting region 515 of the base 512, the spring plungers 232 release their tension when the spring plungers 232 encounter the detent 604 within the mounting region 515. As a result, the bubble adapter 104 is secured to the PTZ camera 102.

The surfaces of the spring plungers 232 are preferably spherical, allowing the spring plungers 232 to "snap" in and out of place within the detent 604 in response to adjustment of the bubble adapter 104 about the base 512 of the PTZ camera 102 by the installer. Because the detent 604 encircles the entirety of the base 512, the installation of the bubble adapter 104 to the PTZ camera 102 does not require special alignment considerations between the bubble adapter 104 and the PTZ camera 102. Moreover, once the bubble adapter 104 is installed, the action of the spring plungers 232 allow installers to easily detach and reattach the bubble adapter 104 from the base 512 without the aid of tools, in one example.

In one implementation, the housing 204 has three spring plungers 232, the pockets 210 of which are equally spaced apart within the housing 204. This provides optimal load balancing of the bubble adapter 104 when connected to the PTZ camera 102. The housing 204 includes a safety lanyard 220 that the installer optionally fastens to the base 512 via a FIG. 8 thumb screw 804 during the installation of the bubble adapter 104.

The safety lanyard 220 prevents the bubble adapter 104 from dropping during installation, which protects the bubble adapter 104 from damage and the installer from potential injury during the installation process. The housing 204 also includes a tamper resistant bracket 222 to discourage patrons and non-security personnel from tampering with the bubble adapter 104.

Figure 4:
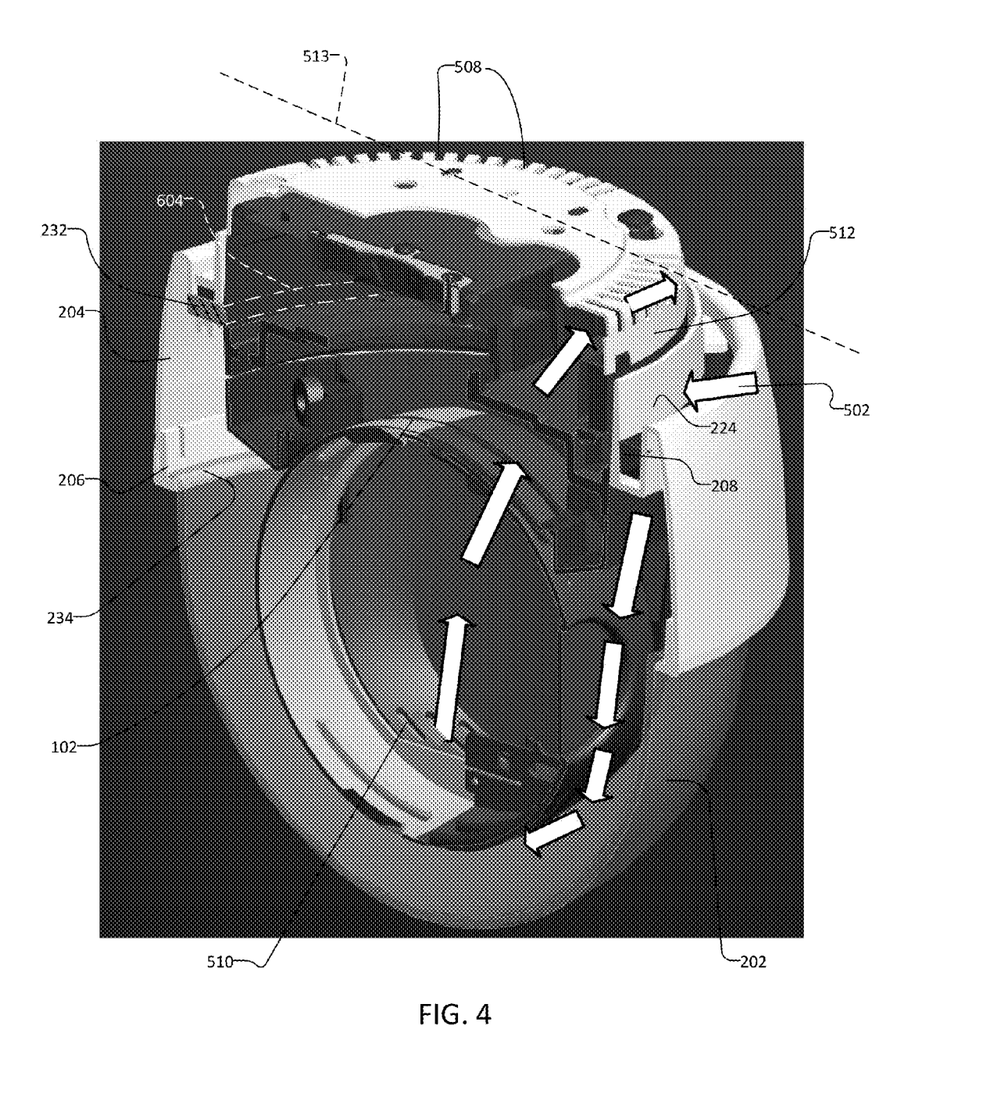
FIG. 4 is a scale cross-sectional view of the bubble adapter secured to the PTZ camera showing the airflow through the bubble adapter and PTZ camera assembly for cooling the PTZ camera.

FIG. 4 displays the airflow 502 through the combined bubble adapter 104 and PTZ camera 102 assembly for cooling the PTZ camera 102. The base 512 of the PTZ camera 102 is typically mounted to a ceiling 120. The combined bubble adapter 104 and PTZ camera 102 assembly is shown relative to the plane 513 of the ceiling 120. The integrated airflow design of the bubble adapter 104 enables cooling of the PTZ camera 102 when the bubble adapter 104 is attached to the PTZ camera 102. Preferably, the bubble 202 of the bubble adapter 104 attaches to the housing 204 via an interference fit provided by a trim ring 206.

Fans within the base 512 of the PTZ camera 102 draw outside air into the PTZ camera 102 via the air intake channel 224 of the housing 204. The airflow 502 passes through the air filter 208, and down the FIG. 6 air intake openings 212, which are obscured by the air filter 208 in FIG. 4. The airflow 502 is drawn up through the air inlets 510 of the PTZ camera 102, across the internal components (which are not shown for clarity) of the PTZ camera 102, and exits out through the air exhaust openings 508 of the base 512 of the PTZ camera 102.

Figure 5:
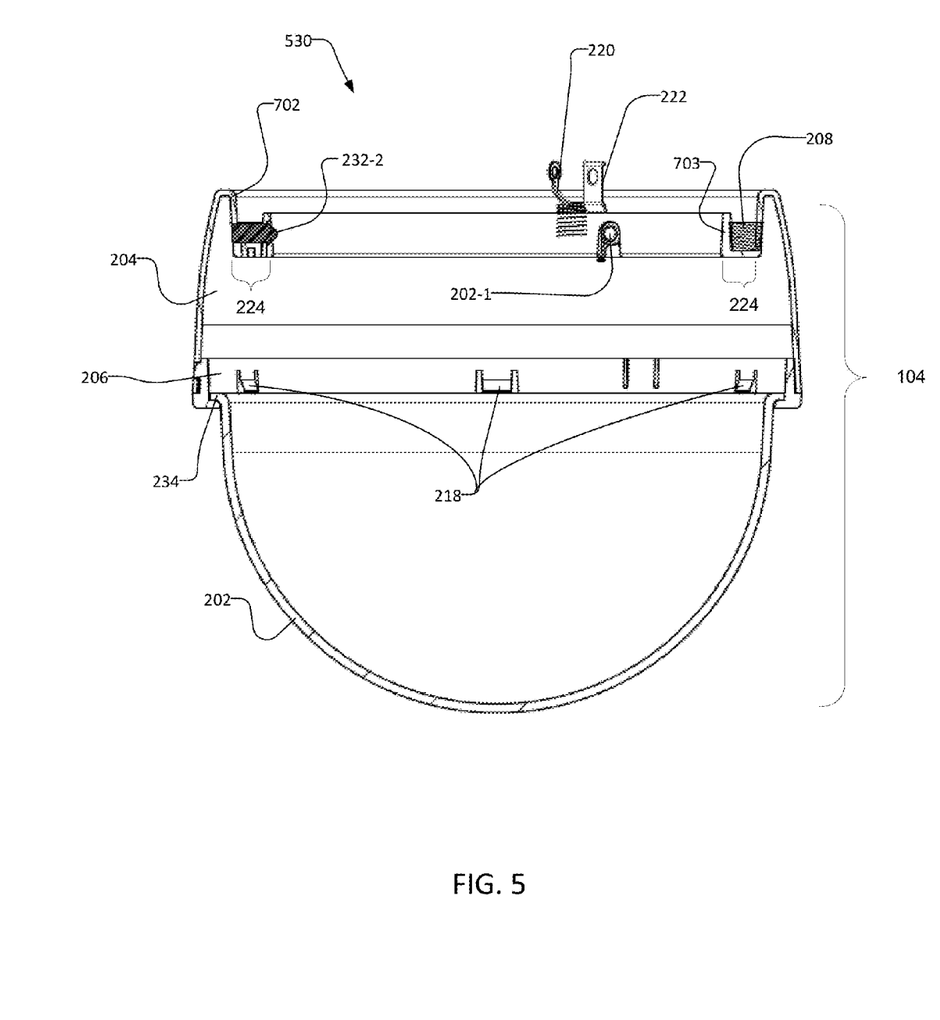
FIG. 5 is a cross-sectional view of the bubble adapter.

FIG. 5 is a cross-sectional view 530 of the bubble adapter 104 that shows how the bubble 202 fastens to housing 204. The trim ring 206 slides over the lip 234 of the bubble 202. The trim ring 206 then fastens to the housing 204, which secures the lip 234 of the bubble 202 to the housing 204. To achieve this, the trim ring 206 has integrated tabs 218 that lock into place within tab openings of the housing 204. This is illustrated in more detail in FIG. 6. When the tabs 218 are fully seated within the tab openings 24-9, the bubble 202 is secured to the housing 204 of the bubble adapter 104.

The cross-sectional view 530 also provides a "head-on" view of spring plunger 232-1, and a side view of spring plunger 232-2 through the air intake channel 224.

Figure 6:
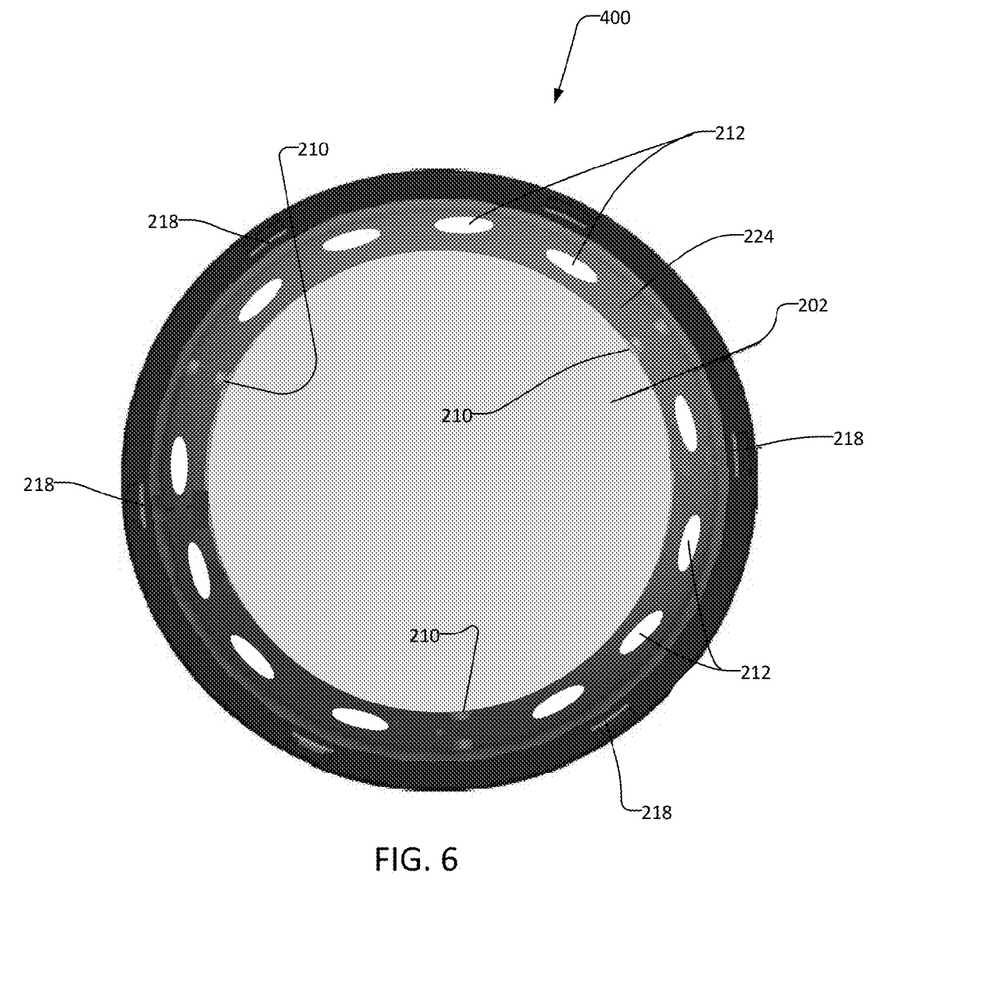
FIG. 6 is a top view of the bubble adapter.

FIG. 6 shows the top view 400 of the bubble adapter 104, which is the view when the bubble 202 is closest to the viewer. The air filter 208 is removed in this view to show the air intake openings 212 and the pockets 210 within the air intake channel 224 of the housing 204. The tabs 218 of the trim ring 206 are shown through the tab openings of the housing 204. The tab openings in the housing 204 accept the tabs 218 of the trim ring 206. The trim ring 206 slips around the lip 234 of the bubble 202. When the tabs 218 of the trim ring 206 are pushed to their full extent into the tab openings, the tabs 218 lock into place within the tab openings. This secures the trim ring 206 to the housing 204, and therefore, the bubble 202 to the housing 204.

Figure 7:
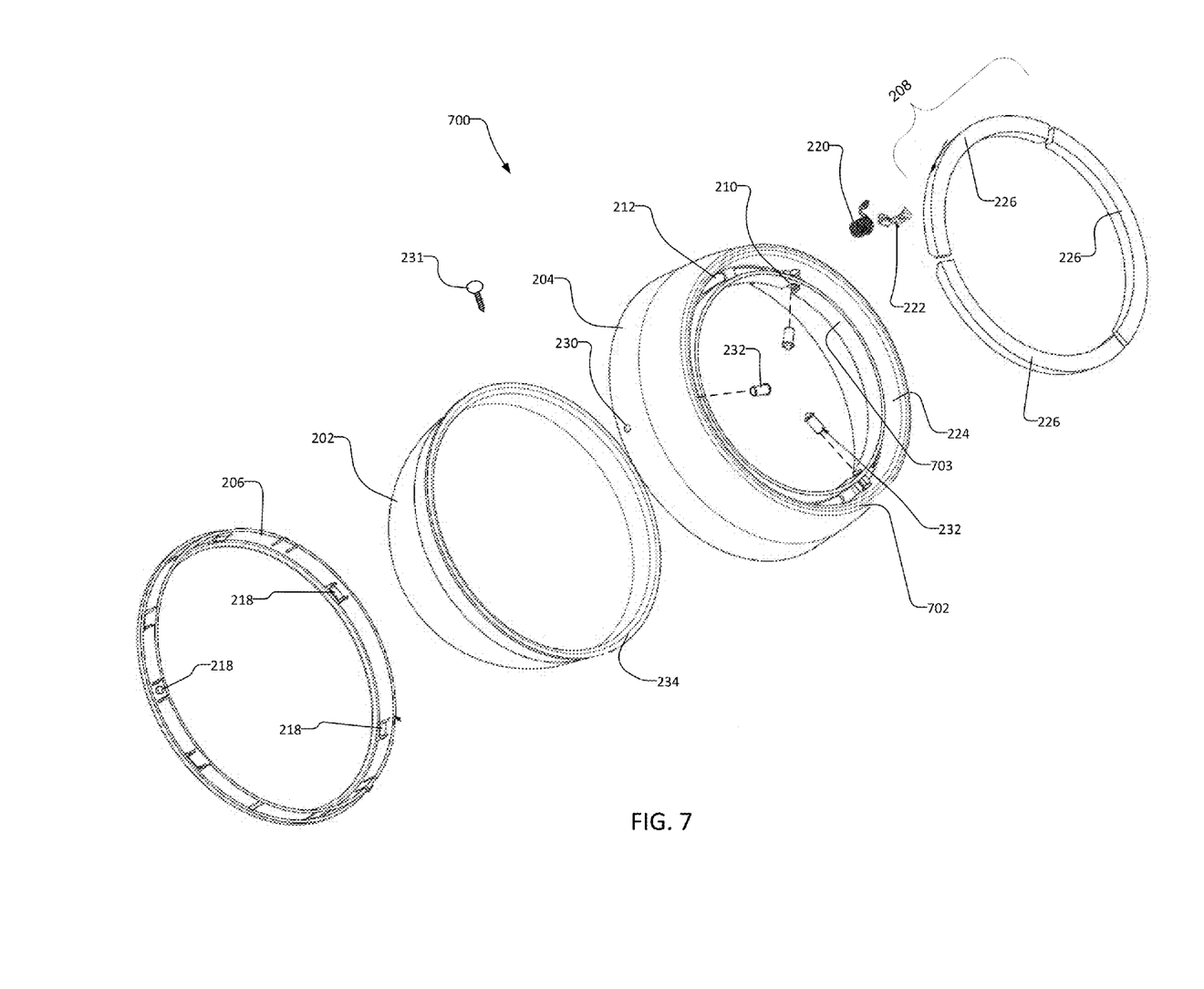
FIG. 7 is a partially-exploded view of the bubble adapter showing its components.

FIG. 7 is a partially-exploded view 700 of the bubble adapter 104. The trim ring 206 slips over the lip 234 of the bubble 202. When the tabs 218 of the trim ring 206 are fully seated within the FIG. 6 tab openings 219, the bubble 202 is securely fastened to the housing 204.

The partially-exploded view 700 provides more detail of the spring plungers 232 and their pockets 210, an unobstructed view of the air intake openings 212, and more detail of the air filter 208. The air filter 208 has filter sections 226 that preferably press-fit into place within the air intake channel 224. In one example, the filter sections 226 snugly fit between the spring plungers 232 that protrude through the air intake channel 224.

In the preferred embodiment, the bubble 202 has a darkened or "smoked" finish or appearance that hides where the camera lens 610 is pointing. This hides the camera lens 610 from the view of patrons. The finish does not otherwise affect the operation of the PTZ camera 102. In another example, the bubble 202 has a frosted or milky appearance, as in FIG. 3.

In one example, the bubble 202 is made of glass. In another example, the bubble 202 is made of high-impact plastic. The housing 204 also includes a set screw hole 230 that accepts a set screw 231. The installer tightens the set screw 231 within the set screw hole 230 until the set screw 231 fastens the housing 204 of the bubble adapter 104 to the base 512 of the PTZ camera 102. This permanently attaches the bubble adapter 104 to the PTZ camera 102 after the bubble adapter 104 is attached to the PTZ camera 102 via the interference fit provided by the combination of the spring plungers 232 and the detent 604.

In yet another example, the bubble adapter 104 is attached to the PTZ camera using only the aforementioned permanent set screw mechanism, by tightening the set screw 231 within the set screw hole 230 until the housing 204 is attached to the base 512 of the PTZ camera 102.

Figure 8:
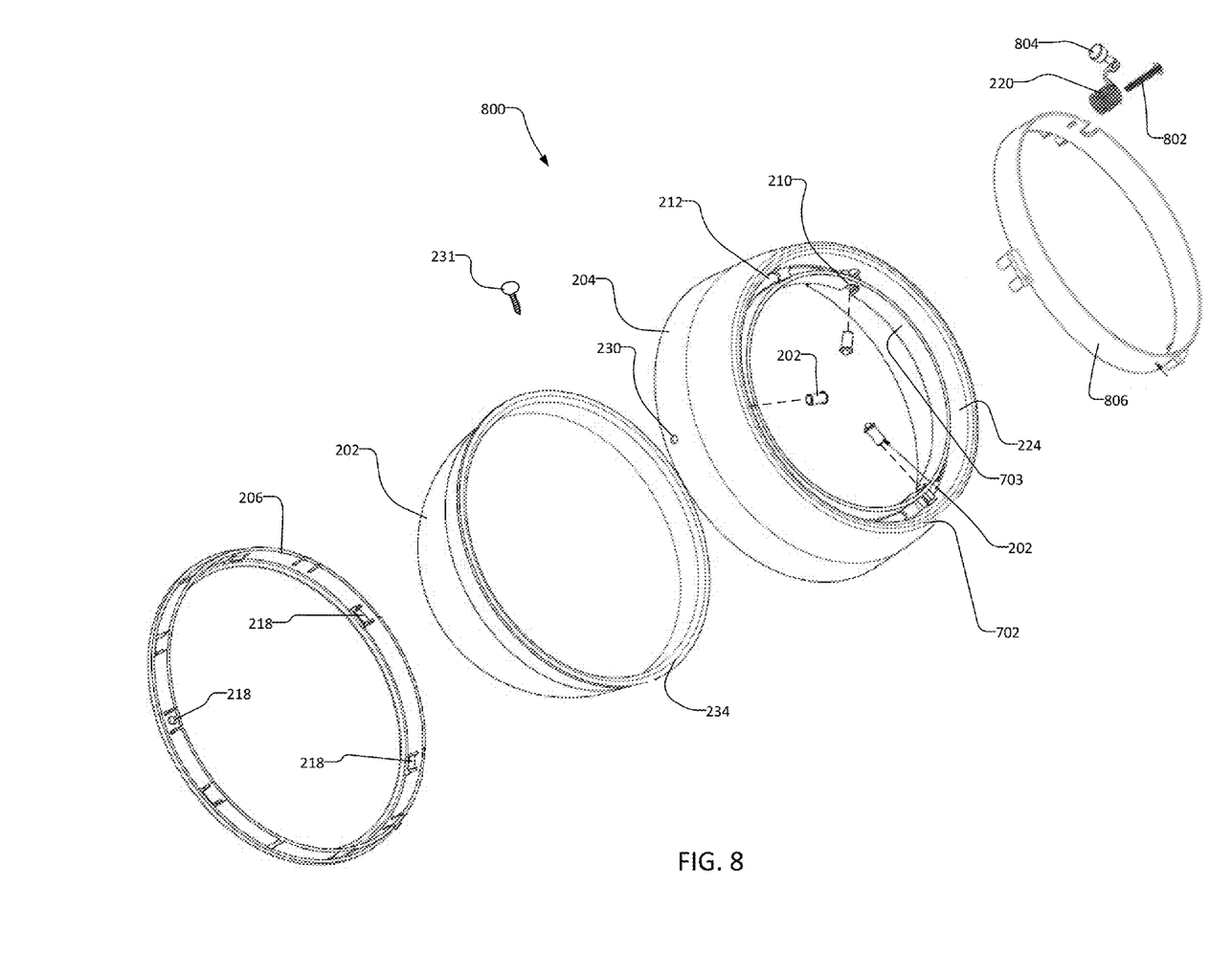
FIG. 8 is a partially-exploded view of another embodiment of the bubble adapter showing its components, which includes a cover ring.

FIG. 8 is a partially-exploded view 800 of another embodiment of the bubble adapter 104. The bubble adapter 104 in FIG. 8 is nearly identical to the bubble adapter 104 in FIG. 7, with FIG. 8 including an additional cover ring 806 that attaches to the housing 204 via a screw 802. In general, the cover ring 806 functions as a cosmetic cover which hides the standard black body of the PTZ camera 102 when used with a non-black bubble adapter 104. The air filter 208 is omitted from FIG. 8 to permit view of the cover ring 806.

Instead of the safety lanyard 220 attaching to the housing 204 as shown in FIG. 3 and FIG. 7, the safety lanyard 220 attaches to the cover ring 806 in FIG. 8. The cover ring 806 seats within the air intake channel 224 and is secured to the housing 204 via screw 802. In one implementation, the screw 802 is made of plastite material.

Once the bubble adapter 104 is attached to the PTZ camera 102, the installer attaches the safety lanyard 220 to the base 512 of the PTZ camera 102 via thumbscrew 804.

Figure 9:
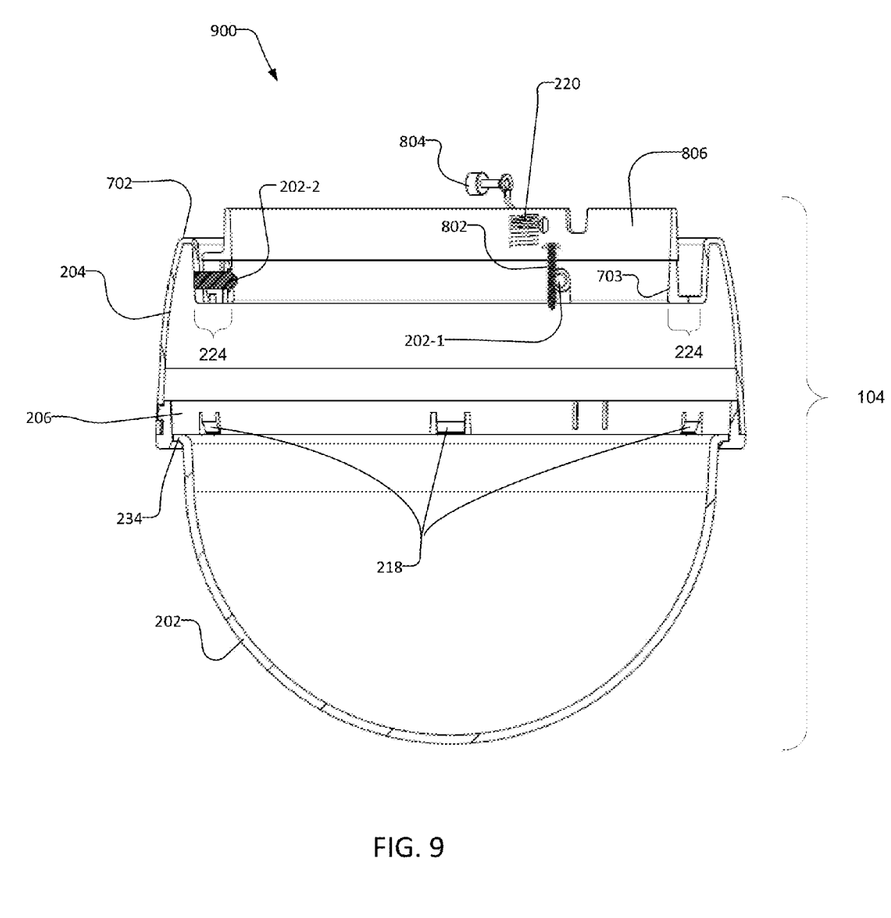
FIG. 9 is a cross-sectional view of the bubble adapter for the embodiment shown in FIG. 8.

FIG. 9 is a cross-sectional view 900 of the bubble adapter 104 according to the embodiment of FIG. 8. The cross-sectional view 900 is substantially similar to the cross-sectional view 530 in FIG. 5, with the main differences being that the tamper resistant bracket 222 is not included in FIG. 9, and the safety lanyard 220 attaches to the cover ring 806.

The cover ring 806 seats within the air intake channel 224 and is secured to the housing 204 by screw 802. The included thumbscrew 804 provides for convenient attachment of the safety lanyard 220 to the base 512 of the PTZ camera 102 for added safety during installation of the bubble adapter 104 to the PTZ camera 102. The tamper resistant bracket 222 discourages tampering of the bubble adapter 104 once attached to the PTZ camera 102.

Figure 10:
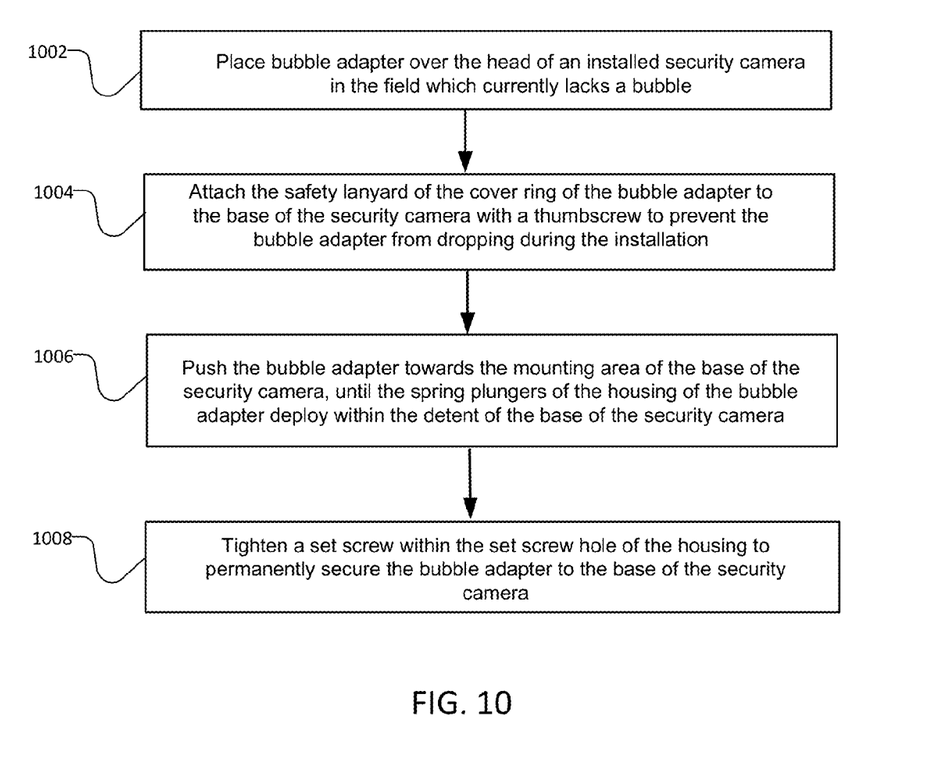
FIG. 10 provides a method for installing a bubble adapter to an existing security camera in the field that currently lacks a bubble.

FIG. 10 presents a method for attaching a bubble adapter 104 to an installed PTZ camera 102 in the field, such as a PTZ camera 102 mounted in a ceiling 120. In step 1002, an installer places the bubble adapter 104 over the head 514 of an installed security camera 102 in the field which currently lacks a bubble 202. Then, according to step 1004, the installer attaches the safety lanyard 220 of the cover ring 806 of the bubble adapter 104 to the base 512 of the PTZ camera 102 with a thumbscrew 804 to prevent the bubble adapter 104 from dropping during the installation.

The installer then pushes the bubble adapter 104 towards the mounting region 515 of the base 512 of the PTZ camera 102, until the spring plungers 232 within the housing 204 of the bubble adapter 104 deploy within the detent 604 of the base 512 of the security camera 102, according to step 1006.

Then, according to step 1008, the installer tightens a set screw 231 within the set screw hole 230 of the housing 204 to permanently secure the bubble adapter 104 to the base 512 of the PTZ camera 102.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera system, comprising:
    a Pan/Tilt/Zoom ("PTZ") head of a security camera;
    a base of the security camera on which the PTZ head is held, the base comprising a mounting region;
    a bubble adapter that fits over the PTZ head, the bubble adapter including a housing that attaches to the base at the mounting region via a field-deployable attachment mechanism, and a bubble attached to the housing that encloses the PTZ head, wherein the housing has a housing air channel, the housing air channel being formed within the housing and including air intake openings that accept air from outside the housing to enable airflow into the security camera; and
    one or more fans which draw air through the air intake openings of the housing into air inlets of the PTZ head of the security camera to cool the security camera, the air being exhausted through air exhaust openings in the base.

2. The system of claim 1, wherein the field-deployable attachment mechanism comprises an interference fit system.

3. The system of claim 1, wherein the field-deployable attachment mechanism comprises a set screw system.

4. The system of claim 1, wherein the housing air channel accepts an air filter placed over air intake openings.

5. The system of claim 1, wherein the housing accepts a trim ring that secures a lip of the bubble to the housing for fastening the bubble to the housing.

6. The system of claim 5, wherein the trim ring fastens the bubble to the housing using an interference fit.

7. The system of claim 1, wherein the housing further comprises a tamper resistant bracket which discourages tampering of the bubble adapter.

8. The system of claim 1, wherein the housing further comprises a cover ring that conceals the base of the security camera after the housing is attached to the base of the security camera.

9. The system of claim 8, further comprising a safety lanyard that fastens to the base of the security camera, which protects the bubble adapter from dropping during attachment and removal.

10. The system of claim 1, wherein the bubble has a smoked appearance which provides the concealment of the security camera and its components.

11. A security camera system, comprising:
a Pan/Tilt/Zoom ("PTZ") head of a security camera;
a base of the security camera on which the PTZ head is held, the base comprising a mounting region; and
a bubble adapter that fits over the PTZ head, the bubble adapter including a housing that attaches to the base at the mounting region via a field-deployable attachment mechanism, and a bubble attached to the housing that encloses the PTZ head, wherein the housing has a housing air channel that enables airflow between an inside and outside of the housing;
wherein the field-deployable attachment mechanism comprises an interference fit system, the interference fit system including:
spring plungers disposed in pockets within the housing of the bubble adapter; and
a detent in the mounting region of the base which accepts the spring plungers.

12. The system of claim 11, wherein the pockets extend radially outward from an inside surface of an outer rim of the housing.

13. The system of claim 11, wherein the housing air channel is formed within the housing and includes air intake openings that accept air from outside the housing to enable airflow into the security camera.

14. The system of claim 13, wherein the air intake openings of the housing provide the airflow for air inlets of the PTZ head of the security camera for cooling the security camera.

15. The system of claim 13, wherein the base of the security camera includes:
one or more fans which draw the airflow provided by the air intake openings of the housing into air inlets of the PTZ head of the security camera to cool the security camera; and
air exhaust openings which allow the airflow to exit the security camera.

16. A bubble adapter for an installed security camera, comprising:
a housing that attaches to the security camera, including:
an airflow system that allows airflow to the security camera for thermal control when the housing is attached to the security camera, the air flow system comprising a housing air channel that enables airflow between an inside and outside of the housing;
a bubble fastened to the housing that encloses at least a head of the security camera for protecting and concealing the security camera; and
an interference fit system for securing the bubble adapter to the security camera, the interference fit comprising spring plungers disposed in pockets within the housing of the bubble adapter for a detent in a mounting region of a base of the security camera that accepts the spring plungers.

17. The bubble adapter of claim 16, further comprising a set screw system for securing the bubble adapter to the security camera.

18. The bubble adapter of claim 16, wherein the housing air channel includes air intake openings that accept air from outside the housing to enable the airflow to the security camera.

19. A method for upgrading an installed security camera in the field to have a bubble, comprising:
placing a bubble adapter over a head of the security camera;
pushing the bubble adapter towards a mounting region of a base of the security camera on which the head is held;
attaching the bubble adapter to the base at the mounting region via a field deployable attachment mechanism;
the security camera exchanging air with an environment through the bubble adapter using a housing air channel formed within the housing that accepts air from outside the housing to enable airflow into the security camera using one or more fans which draw air through the housing air channel into air inlets of the head of the security camera to cool the security camera, the air being exhausted through air exhaust openings in the base.

* * * * *